United States Patent [19]

Hsieh et al.

[11] Patent Number: 4,603,171

[45] Date of Patent: Jul. 29, 1986

[54] BLOCK COPOLYMERS CONTAINING POLYMERIZED LACTONE SEGMENTS

[75] Inventors: Henry L. Hsieh; I. Wayne Wang, both of Bartlesville, Okla.

[73] Assignee: Phillips Petroleum Company, Bartlesville, Okla.

[21] Appl. No.: 589,919

[22] Filed: Mar. 15, 1984

[51] Int. Cl.$^4$ .................. C08F 257/02; C08F 279/02
[52] U.S. Cl. ..................... 525/105; 525/106; 525/331.9; 525/332.3; 525/333.3; 525/359.2; 525/370; 525/386; 525/385
[58] Field of Search ............ 525/105, 106, 359.2, 525/386, 332.3, 385, 333.2, 333.3, 331.9, 370; 528/358

[56] References Cited

U.S. PATENT DOCUMENTS

| | | | |
|---|---|---|---|
| 3,021,313 | 2/1962 | Cox et al. | 260/78.3 |
| 3,312,753 | 4/9167 | Bailey | 260/823 |
| 3,523,920 | 8/1970 | Schultz | 260/37 |
| 3,585,257 | 6/1971 | Mueller, Jr. | 260/880 |
| 3,639,519 | 2/1972 | Hsieh et al. | 525/386 |
| 3,699,190 | 10/1972 | Shimomura | 525/247 |
| 3,867,353 | 2/1975 | Hsieh et al. | 528/358 |
| 4,034,021 | 7/1977 | Foss | 525/386 |
| 4,360,643 | 11/1982 | Naylor | 525/386 |

*Primary Examiner*—Wilbert J. Briggs, Sr.
*Attorney, Agent, or Firm*—John R. Casperson

[57] ABSTRACT

A block copolymer containing a polymerized lactone block is obtained by first treating an alkali metal-terminated base polymer with a metal compound and further reacting the resulting product with lactone monomer.

15 Claims, No Drawings

BLOCK COPOLYMERS CONTAINING POLYMERIZED LACTONE SEGMENTS

BACKGROUND OF THE INVENTION

The invention relates to an improved process for preparing block copolymers containing polymerized lactone segments and to block copolymers containing polymerized lactone segments.

Lactone incorporation into polymer material can result in many improved performance benefits. Among these are improved impact resistance, improved optical properties, improved stress crack resistance. enchanced polymer processability, improved mold releasability, and improved carbon black and pigments dispersion. These benefits, coupled with the wide range of materials with which polymerized lactone-containing polymer is compatible, open up numerous new applcations which could not be filled by materials not having polymerized lactone segments therein.

The prior art has attempted anionic polymerization as a means for providing a polymerized lactone-containing polymeric material. The anionic ring-opening polymerization of lactones which involves acyloxygen cleavage with subsequent propagation through alkoxide anion also provides for the possibility of block polymerizing lactone molecules with other monomers or polymer segments. For example, the alkyl lithium-initiated polystyryl and polydienyl anions, or their corresponding oxyl-terminated anions, have been employed as macroactivators to cross-initiate lactone, such as caprolactone, polymerization. However, it has proved very difficult to channel the esterification reactions under the basic environment into the desired mode of selectivity to the exclusion of unzipping and scrambling transesterifications as the side reactions compete with polyester formation. The depolyesterification due to intramolecular transesterification, e.g., unzipping or backbiting phenomena produces cyclic ester oligomer contamination. Intermolecular transesterification (ester scrambling) generally results in uncontrolled molecular weight and broad molecular weight distribution.

A new approach to cope with the ester exchange side-reactions would be desirable.

OBJECTS OF THE INVENTION

It is an object of this invention to provide a process for lactone polymerization which proceeds with the desired selectivity.

It is a further object of this invention to provide a polymer containing polymerized lactone segment(s).

STATEMENT OF THE INVENTION

The invention can be viewed in one aspect as a process in which a first product is provided by bringing together under polymerization conditions an alkali metal hydrocarbyl with at least one of the monomers selected from the group consisting of conjugated dienes having 4 to 12 carbon atoms per molecule and monovinyl aromatic compounds having 8 to 13 carbon atoms per molecule. A second product is provided by bringing together the first product with an oxirane compound with which the first product is reactable. Suitable oxirane compounds will generally contain from 1 to about 10 oxirane or epoxy groups per molecule and be provided in an amount of at least 0.1 oxirane groups per alkali metal atom in the first product. A third product is then produced by bringing together the second product with a metal compound with which the second product is reactable. Some suitable metal compounds can be represented by the formula

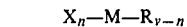

$$X_n-M-R_{v-n}$$

where M represents a metal selected from the group consisting of aluminum, zinc, tin, cadmium, germanium, silicon, and titanium, R represents a monovalent essentially hydrocarbon radical containing from 1 to 20 carbon atoms, X represents a monovalent basic moiety capable of abstracting the alkali metal from the second product, v is the valence of M and n is at least one and represents the number of X radicals connected to each M. The polymerized lactone-containing polymer product (fourth product) is then provided by bringing together under polymerization conditions the third product with lactone monomer. Suitable lactone monomer will generally contain from about 3 to about 20 carbon atoms per molecule.

The invention can be viewed in other aspects as providing an improved process for the preparation of a copolymer into which lactone monomer is incorporated. Generally, the lactone monomer is incorporated into the polymer by reacting a "living" base polymer, i.e. one which is alkali metal terminated, with the oxirane compound then with lactone monomer. The improvement comprises reacting the oxirane-treated alkali metal-terminated base polymer with a metal compound which can be represented by the formula

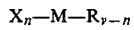

$$X_n-M-R_{v-n}$$

after reaction with the oxirane compound but before reaction with the lactone monomer. M represents a metal selected from the group consisting of aluminum, zinc, tin, cadmium, germanium, silicon, and titanium, R represents a monovalent essentially hydrocarbon radical containing from 1 to 20 carbon atoms, X represents a monovalent basic moiety capable of abstracting the alkali metal from the oxirane-treated alkali metal-terminated base polymer, v is the valence of M and n is at least 1 and represents the number of X radicals connected to M.

By converting the oxyl-alkali metal end groups to oxyl-metal end groups, such as O—Al, O—Zn, or O—Sn, there is provided a new propagating site which has decreased basicity for lactone polymerization. The process is more easily controlled, proceeds to a higher degree of completion in a short time period and with better selectivity than the prior art process.

DETAILED DESCRIPTION OF THE INVENTION

The polymerized lactone-containing polymer of this invention can be blended into a wide variety of base polymers in accordance with the invention. The invention will probably have its greatest importance where the lactone material is blended into a commercial resin, such as a PVC, polycarbonate, polyester, ABS, styrene-acrylonitrile resin, for example. The polymerized lactone-containing materials are compatible with these resins. Because the polymer made according to the invention can have a polar segment and a non-polar segment, it could also be used as a compatibility aid in the blending of a polar resin with a nonpolar polymer.

The alkali metal-terminated base polymer can be formed from at least one of the monomers selected from the group consisting of conjugated dienes having 4 to 12 carbon atoms per molecule and monovinyl aromatic compounds having 8 to 13 carbon atoms per molecule. Suitable conjugated dienes include butadiene, isoprene, piperylene, 6-phenyl-1,3-hexadiene, and the like. Suitable monovinyl substituted aromatic compounds include styrene, 3-methylstyrene, 4-methylstyrene, 4-isopropylstyrene, 2,4-dimethylstyrene, 1-vinylnaphthalene, 2-vinylnaphthalene, 2-isopropenyl naphthalene, alkyl derivatives thereof, and the like. The base polymer can be a homopolymer of a conjugated diene or a monovinyl substituted aromatic compound or a random or block copolymer of 2 or more conjugated dienes or 2 or more monovinyl substituted aromatic compounds or a random block copolymer formed from a mixture of at least one conjugated diene and at least one monovinyl substituted aromatic compound.

These monomers can be polymerized using organoalkali metal compounds as initiators. A preferred initiator is hydrocarbyllithium compound where the hydrocarbon radical is selected from the group consisting of aliphatic, cycloaliphatic and aromatic radicals and combinations thereof and contains 1–4 lithium atoms. Suitable materials will generally contain from 1 to 20 carbon atoms although it is within the scope of the invention to use higher moleculer weight compounds. Alkyl monolithium compounds are presently preferred, especially n-butyllithium. Examples of compounds which may be used include
methyllithium,
isopropyllithium,
n-butyllithium
tert-octyllithium
n-decyllithium,
phenyllithium,
naphthyllithium,
4-butylphenyllithium,
p-tolyllithium,
4-phenylbutyllithium,
cyclohexyllithium,
4-butylcyclohexyllithium,
4-cyclohexylbutyllithium,
dilithiomethane,
1,4-dilithiobutane,
1,10-dilithiodecane,
1,20-dilithioeicosane,
1,4-dilithio-2-butene,
1,8-dilithio-3-decene,
1,4-dilithiobenzene,
1,5-dilithionaphthalene,
1,2-dilithio-1,2-diphenylethane,
9,10-dilithio-9,10-dihydroanthracene,
1,2-dilithio-1,8-diphenyloctane,
1,3,5-trilithiopentane,
1,5,15-trilithioeicosane,
1,3,5-trilithiocyclohexane,
1,2,5-trilithionaphthalene,
1,3,5-trilithioanthracene,
1,3,5,8-tetralithiodecane,
1,5,10,20-tetralithioeicosane,
1,2,3,5-tetralithiocyclohexane, and
1,2,3,5-tetralithio-4-hexylanthracene.
The dilithium adducts of 2,3-dialkyl-1,3-butadiene such as 2,3-dimethyl-1,3-butadiene and dilithium adducts of butadiene and isoprene containing from 1 to 10 diene units per molecule can also be used. The polymerization procedures for the above monomers and initiators are known.

The alkali metal-terminated base polymer can be brought together with an oxirane or epoxy compound with which it is reactable to form an oxygen-alkali metal bond. Suitable oxirane compounds will generally contain from 1 to 10 oxirane or epoxy groups per molecule and contain from 2 to about 60, generally from 2 to 20 carbon atoms per molecule.

Suitable oxirane compounds include
epichlorohydrin,
ethylene oxide,
propylene oxide (1,2-epoxypropane)
butylene oxide (1,2-epoxybutane and 2,3-epoxybutane)
1,2-epoxypentane,
1,2-epoxy-3-methylbutane,
2,3-epoxy-3-methylbutane,
1,2-epoxy-2,4,4-trimethylpentane,
1,2-epoxycyclohexane,
1,2-epoxycyclooctane,
1,2-epoxy-4-cyclohexylpentane,
1,2-epoxyoctadecane,
1,2-epoxyeicosane,
styrene oxide,
1,2-epoxytriacontane,
1,2-epoxy-2-cyclohexylbutane,
3,4-epoxy-3,4-diethylhexane
3,4-epoxy-3-ethyl-4-phenylhexane,
1,2-epoxy-2-(p-tolyl)butane,
2,3-epoxy-3-methyl-2-benzylpentane,
1-bromo-2,3-epoxypropane,
1,5-dichloro-2,3-epoxypentane,
2-iodo-3,4-epoxybutane,
2,3:5,6-diepoxyhexahydro-4,7-methanoindane,
1,2:8,9-diepoxy-p-methane,
1,2:4,5:7,8-triepoxyoctane,
1,2:4,5:7,8:10,11:13,14:16,17-hexaepoxyeicosane,
1-(9,10:12,13:15,16-triepoxyoctadecanoate)-2(9,10:12,13-diepoxyoctadecanoate)-3-(9,10-epoxyoctadecanoate)glycerol,
tris(9,10:12,13:15,16-triepoxyoctadecanoate), glycerol,
tris(9,10:12,13-diepoxyoctadecanoate), glycerol,
tris-9,10-epoxyoctadecanoate), and the like.
Epichlorohydrin, ethylene oxide, 1,2-epoxypropane, 1,2-epoxybutane and 2,3-epoxybutane are preferred.

Generally the oxirane compound will be provided in an amount to result in at least 0.1 oxirane group for each alkali metal atom in the alkali metal-terminated base polymer. Preferably, the oxirane compound is provided in an amount to result in at least one oxirane group for each alkali metal atom in the base polymer, although much larger amounts can be used if desired. A practical upper limit of oxirane compound to employ is an amount so as to result in 10 oxirane groups per alkali metal atom in the alkali metal-terminated base polymer. A presently preferred amount of oxirane compound is an amount sufficient to result in the range of from about 0.5 to about 5 oxirane groups for each alkali metal atom in the metal-terminated base polymer.

The oxirane compound can be contacted with the alkali metal-terminated base polymer under any reaction conditions, preferably elevated temperatures and pressures sufficient to maintain the reactants substantially in the liquid phase. Preferred reaction temperatures are from about −30° to about 150° C., preferably from about 0° to about 120° C. Reaction times can be from about 1 second to about 2 hours.

In another aspect of the present invention, novel radial block polymers which contain 2 or more polymerized lactone segments can be provided by reacting the alkali metal-terminated base polymer with a polyepoxy compound containing two or more epoxy or oxirane groups. Dioxirane compounds are preferred, such as 1,3-butadiene diepoxide or 1,2,7,8-diepoxyoctane, for example. Where it is desired to produce these novel radial block polymers, it is preferable to more carefully control the molar ratio of the oxirane compound with respect to the alkali metal-terminated base polymer. Preferably, an amount of diepoxide is brought together with the alkali metal-terminated base polymer so as to provide approximately one oxirane group for each alkali metal atom in the alkali metal-terminated base polymer. Although the diepoxide compound can be provided in an amount sufficient to result in the range of from about 0.5 to about 2 oxirane groups for each alkali metal atom in the alkali metal-terminated base polymer, the product mixture will be less complicated where a near stoichiometric amount of the diepoxide is used. A molar amount of about 0.5 moles of diepoxy compound per gram atom of alkali metal in the alkali metal-terminated base polymer is thus preferred.

The product resulting from the bringing together of the alkali metal-terminated base polymer and oxirane compound is then contacted with a metal compound, preferably a nonalkali metal organometal compound containing at least one moiety or ligand capable of abstracting the alkali metal from the oxirane treated alkali metal-terminated base polymer. Some suitable metal compounds can be represented by the formula

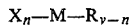

where M represents a metal selected from the group consisting of aluminum, zinc, tin, cadmium, germanium, silicon, and titanium; R represents an essentially hydrocarbyl radical, such as a monovalent hydrocarbon radical free of ethylenic and acetylenic unsaturation. X represents a halogen atom, such as chlorine, fluorine, bromine or iodine, preferably chlorine, or other active moiety, such as hydrocarbyloxy containing 1 to 20 carbon atoms; v is the valence of M, and n is at least 1 and represents the number of X groups connected to M. Preferably, n is less than v, most preferably n equals one. R can be alkyl, aryl, cycloalkyl, aralkyl, alkaryl, for example. Illustrative monovalent hydrocarbon radicals include, for example, methyl, ethyl, propyl, isobutyl, sec-butyl, t-butyl, n-butyl, hexyl, 2-ethylhexyl, the decyls, the octadecyls, cyclopentyl, cyclohexyl, 2-methylcycloheptyl, phenyl, benzyl, ortho-, meta-, and para-tolyl, the xylyls, butylphenyl, phenylethyl, phenylpropyl, and the like. Exemplary hydrocarbyloxy radicals include, for instance, methoxy, ethoxy, n-propoxy, isopropoxy, sec-butoxy, n-butoxy, t-butoxy, hexoxy, 2-ethylhexoxy, octadecoxy, phenoxy, 2-phenylethoxy, benzyloxy, and 3-phenylpropoxy.

The contacting of the metal compound with the oxirane-treated alkali metal-terminated base polymer occurs prior to the reaction between the lactone monomer with the base polymer.

Suitable metal compounds include, for example, organoaluminum halides, organozinc halides, and organosilicon halides. Specific illustrations include ethylaluminum dichloride, methylzinc bromide, and dimethyldichlorosilane. The presently preferred metal compound is a dialkylaluminum halide containing from 2 to 12 carbon atoms, such as where the alkyl is methyl, ethyl, propyl and/or butyl. Diethylaluminum chloride, which has been used with good results is especially preferred.

The metal compound is provided so as to result in at least 0.1 atoms metal of the metal compound for each atom alkali metal in the oxirane-treated alkali metal-terminated base polymer. Usually, sufficient metal compound is contacted with the product resulting from the bringing together of the oxirane compound with the alkali metal-terminated base polymer to provide from 0.1 to about 5 atoms metal of the metal compound for each atom alkali metal in the alkali metal-terminated base polymer. To obtain best results, it is preferable to contact the alkali metal-terminated base polymer with an amount of metal compound sufficient to provide from about 0.5 to about 2 atoms of metal of the metal compound for each atom of the alkali metal in the alkali metal-terminated base polymer.

The reaction between the alkali metal-terminated base polymer and the nonalkali metal compound is easily carried out by maintaining the reactants in solution, in the absence of water, at a slightly elevated temperature in the range of 30° to 100° C. if desired, and for a time period ranging from 0.1 minute to one hour or more, preferably one minute to 30 minutes. In a preferred embodiment of the invention, the contacting between the oxirane-treated alkali metal-terminated base polymer and the metal compound occurs in the presence of an optional, but desirable, polar compound which serves as a component of the solvent mixture. The polar compound can break up organoalkali aggregates. It is important that the polar compound does not inactivate organoalkali catalyst. Specific examples of such polar materials include dimethyl ether, diethyl ether, ethyl methyl ether, ethyl propyl ether, di-n-propyl ether, di-n-octyl ether, dibenzyl ether, diphenyl ether, anisole, tetramethylene oxide (tetrahydrofuran), 1,2-dimethoxyethane, dioxane, paraldehyde, dimethyl sulfide, diethyl sulfide, di-n-propylsulfide, di-n-butyl sulfide, methyl ethyl sulfide, dimethylethylamine, tri-n-propylamine, tri-n-butylamine, trimethylamine, triethylamine, N,N-dimethylaniline, tetramethylethylenediamine, pyridine, quinoline, N-ethylpiperidine, N-methyl-N-ethylaniline, N-methylmorpholine, and the like. Tetrahydrofuran is preferred. It is to be understood also that mixtures of polar compounds can be employed in the practice of the instant invention. The polar compound is sometimes present during the preparation of the base material as, for example, a randomizer or a vinyl promoter. When employed in the polymerization of conjugated diene and/or monovinyl aromatic, the polar compound is generally present in an amount of from 0.005 to about 10 parts by weight per 100 parts by weight of monomer. It is generally present in the reaction between the oxirane-treated alkali metal-terminated base polymer and the metal compound in an amount of from about 0 to about 50 phm (parts by weight per 100 parts by weight of monomers) preferably in the range of from about 2 to about 10 phm. It is sometimes desirable to employ polar compound in the polymerization of conjugated diene and/or vinyl aromatic and then to employ additional amounts of polar compound just prior to addition of metal compound.

A lactone is contacted with the product resulting from the bringing together of the metal compound and the oxirane-treated alkali metal-terminated base polymer. Suitable lactone monomers will generally contain from 3 to about 20 carbon atoms per molecule. Usually, the lactone monomer will contain from 3 to 12 carbon atoms per molecule and will contain a 4, 6, 7 or 8 membered ring. The 5 membered ring lactone is very stable and therefore not a good candidate for reactions involving opening of the ring. ε-Caprolactone and substituted derivatives thereof are the preferred materials for the inventive process. Acceptable ring substituents include alkyl of from 1 to 4 carbon atoms, alkoxy of from 1 to 4 carbon atoms, and halogen which, if present, is preferably chlorine. To insure that lactone is reactable with the product resulting from contacting the metal compound and the oxirane-treated alkali metal-terminated base material the lactone should not be substituted so that the reaction is sterically hindered. Generally, no more than 3 of the ring substituents are groups other than hydrogen.

Suitable lactones include
beta-propiolactone,
delta-valerolactone,
epsilon-caprolactone,
d,l-lactide
and lactones corresponding to the following acids:
2-methyl-3-hydroxypropionic acid,
3-hydroxynonanoic or 3-hydroxypelargonic acid,
2-dodecyl-3-hydroxypropionic acid,
2-cyclopentyl-3-hydroxypropionic acid,
3-phenyl-3-hydroxypropionic acid,
2-naphthyl-3-hydroxypropionic acid,
2-n-butyl-3-cyclohexyl-3-hydroxypropionic acid,
2-phenyl-3-hydroxytridecanoic acid,
2-(2-methylcyclopentyl)-3-hydroxypropionic acid,
2-methylphenyl-3-hydroxypropionic acid,
3-benzyl-3-hydroxypropionic acid,
2-2-dimethyl-3-hydroxypropionic acid,
2-methyl-5-hydroxyvaleric acid,
3-cyclohexyl-5-hydroxyvaleric acid,
4-phenyl-5-hydroxyvaleric acid,
2-heptyl-4-cyclopentyl-5-hydroxyvaleric acid,
2-methyl-3-phenyl-5-hydroxyvaleric acid,
3-(2-cyclohexylethyl)-5-hydroxyvaleric acid,
4-benzyl-5-hydroxyvaleric acid,
3-ethyl-5-isopropyl-6-hydroxycaproic acid,
2-cyclopentyl-4-hexyl-6-hydroxycaproic acid,
3-phenyl-6-hydroxycaproic acid,
3-(3,5-diethylcyclohexyl)-5-ethyl-6-hydroxycaproic acid,
4-(3-phenylpropyl)-6-hydroxycaproic acid,
2-benzyl-5-isobutyl-6-hydroxycaproic acid,
7-phenyl-6-hydroxy-6-octenoic acid,
2,2-dipropenyl-5-hydroxy-5-heptenoic acid,
2,2-di(1-cyclohexyl)-5-hydroxy-5-heptenoic acid, and
2,2-dimethyl-4-propenyl-3-hydroxy-3,5-heptadienoic acid.

The final product copolymers of this invention can vary widely as to their composition. For example, the copolymers can contain from about 1 to about 99 weight percent of one or more lactones based upon the total weight of the monomers used to make the base polymer and the lactone or lactones employed to make up the lactone polymer portion. Accordingly, the monomer or monomers used to make up the base polymer can be present in the final copolymer in the amount of from about 1 to about 99 weight percent based upon the total weight of those monomers and the lactone or lactones used to make up the lactone polymer portion. The base polymer can be a rubbery homopolymer of a conjugated diene, a homopolymer of a monovinyl substituted aromatic compound, or a rubbery or resinous copolymer of a conjugated diene and a monovinyl substituted aromatic compound which copolymer can contain any proportion of the monovinyl substituted aromatic compound.

From the above it can be seen that the base polymer can comprise from about 1 to about 99 weight percent of the final block copolymer based upon the total weight of the final product copolymer, the remainder being substantially the lactone polymer portion. Thus, the final copolymer can contain from about 1 to about 99 weight percent lactone polymer block based on the total weight of the final copolymer. Preferably, the final copolymer contains 5–50 percent by weight polymerized lactone, more preferably, from about 10 to about 40 percent by weight polymerized lactone for a good combination of properties.

If desired, a capping agent can be brought together with the product resulting from the bringing together of the lactone monomer with the product resulting from the bringing together of the metal compound and the epoxy-treated alkali metal-terminated polymer. The capping agent can inactivate the metal end groups of the polymer chain and stabilize the resulting material. It is preferably employed in an amount of stoichiometric or greater with respect to the amount of alkali metal in the alkali metal-terminated base polymer. Suitable capping agents can be selected from isocyanates such as phenyl isocyanate and acid anhydrides such as acetic anhydride, for example.

The polymerization of the monomers to form the base polymer as well as the reaction involving the lactone to form the final copolymer can be carried out at substantially any operable temperature but will generally be in the range of from about −30° to about 150° C., preferably from about 0° to about 120° C. A temperature in the range of 30°–80° C. has been used with good results. The polymerization pressures can also vary widely but will generally be sufficient to maintain the reactants substantially in a liquid state. The polymerization time for both the preparation of the base polymer and the polymerized lactone block is temperature dependent. Sufficient time can be allowed in the formation of the base polymer for substantially complete conversion of the monomer. This time is generally in the range of from about 1 minute or less to about 100 hours or more. The same time considerations and ranges apply to the reaction involving the lactone. The temperatures, times, pressures, and other operating conditions can be the same or different in making the base polymer and in the subsequent lactone polymerization. The polymerization times for making the base polymer and the polymerized lactone block can each be varied as desired to obtain the desired results of quantitative conversion of the monomers or any amount of conversion less than quantitative.

The formation of the base polymer, the reaction of the oxirane compound with the base polymer, the subsequent reaction of the metal compound, and the formation of the polymerized lactone blocks can be carried out in the presence or absence of diluent but it is preferred to employ diluent such as a hydrocarbon diluent selected from the group consisting of paraffins, cycloparaffins, and aromatic hydrocarbons containing 4 to 10 carbon atoms per molecule, inclusive, and mixtures thereof. Other diluents that can be employed are those which are inert to the reactants and products under the conditions employed. These other types of diluents can be employed alone or in admixture with one another or in admixture with hydrocarbon diluents and the like.

The copolymers of this invention can be recovered in any conventional manner such as by catalyst deactivation by the addition of alcohol or other known deactivating agents, separation of the polymer from solution such as by vaporization of the diluents thereby leaving the polymeric product, and drying the polymer.

The final copolymers of this invention when compounded and, if desired, cured, can be made to vary from elastomeric to plastic (resinous), depending upon their polymerized conjugated diene content. They can be compounded with various conventional additives such as carbon black, antioxidants, ultraviolet light stabilizers, foaming agents, and the like in a conventional manner. Olefinically unsaturated copolymers of this invention can be hydrogenated to reduce the amount of residual olefinic unsaturation and thereby increase the resistance of the block copolymers to attack by oxygen, ozone, and other oxidizing agents.

It should be noted that copolymers of two or more polymer blocks can be prepared by this invention. For example, a block terpolymer can be prepared comprising at least one polystyrene block, at least one polybutadiene block, and at least one polylactone block. Copolymers or homopolymers can be employed as blocks in the block copolymers of this invention.

EXAMPLE I

The following inventive and comparative runs illustrate the effectiveness of the present invention in preparing block copolymers of 1,3-butadiene and ε-caprolactone at higher conversion and with a higher degree of control than in the comparative runs.

The following recipe gives the ingredients employed in the inventive and comparative runs.

| Ingredient | Recipe Parts by Weight | MHM$^a$ |
|---|---|---|
| Step 1 | | |
| Cyclohexane | 760 | |
| Tetrahydrofuran$^b$ | 0.05 | |
| 1,3-Butadiene | 70 | |
| n-Butyllithium$^c$ | | 2.4 |
| Step 2 | | |

| Ingredient | Recipe Parts by Weight | MHM$^a$ |
|---|---|---|
| Ethylene oxide$^d$ | | 6.0 |
| Step 3 | | |
| Tetrahydrofuran$^e$ | 5 | |
| Diethylaluminum chloride$^f$ | | 0 or 2.4 |
| Step 4 | | |
| ε-Caprolactone (εCL) | 30 | |
| Step 5 | | |
| Phenylisocyanate$^g$ | | 10 |
| Step 6 | | |
| Butylated hydroxytoluene$^h$ | 1 | |

$^a$MHM means millimoles per hundred parts by weight of monomer, i.e., 1,3-butadiene.
$^b$Used as 10 weight percent solution in cyclohexane.
$^c$Used as 0.47 M solution in n-hexane/cyclohexane mixture.
$^d$Used as 1.99 M solution in cyclohexane.
$^e$Used as undiluted, neat liquid.
$^f$Used as 1.54 M solution in n-heptane.
$^g$Used as 1.01 M solution in cyclohexane
$^h$Used as solution of 40 g BHT in 200 ml glacial acetic acid and 200 ml THF.

Table I gives the polymerization conditions employed in each of the above-described steps.

TABLE I

| | Runs 1–7 | 8–16 | 17–24 | 25–32 |
|---|---|---|---|---|
| Step 1 | | | | |
| Time, hr | 1.5 | 1.5 | 1.5 | 1.5 |
| Temp., °C. | 70 | 70 | 70 | 70 |
| Step 2 | | | | |
| Time, hr | 0.25 | 0.25 | 0.25 | 0.25 |
| Temp., °C. | 40 | 40 | 40 | 40 |
| Step 3 | | | | |
| Time, hr | 0.25 | 0.25 | 0.25 | 0.25 |
| Temp., °C. | 70 | 70 | 70 | 70 |
| Step 4 | | | | |
| Time, hr | variable | variable | variable | variable |
| Temp., °C. | 50 | 50 | 70 | 70 |
| Step 5 | | | | |
| Time, min. | 5 | 5 | 5 | 5 |
| Temp., °C. | 25–50 | 25–50 | 25–50 | 25–50 |

After Step 6 (addition of BHT), which terminated polymerization, polymers were coagulated in 50/50 (volume ratio) methanol/isopropanol and dried in vacuo at 50° C.

Table II gives the polymerization variables and the results of the inventive and comparative runs.

TABLE II

| Run # | Type | DEAC$^a$ | εCL Pzn Temp., °C.$^b$ | εCL Pzn Time, hr$^c$ | % Conv.$^d$ | % εCL$^e$ | HI$^f$ | IV$^g$ |
|---|---|---|---|---|---|---|---|---|
| 1 | Inv. | 2.4 | 50 | 0.25 | 73.5 | 2.6 | 1.17 | 0.76 |
| 2 | Inv. | 2.4 | 50 | 0.50 | 75.9 | 5.3 | 1.17 | 0.77 |
| 3 | Inv. | 2.4 | 50 | 1.0 | 83.0 | 11.1 | 1.17 | 0.79 |
| 4 | Inv. | 2.4 | 50 | 2.0 | 91.3 | 22.3 | 1.22 | 0.85 |
| 5 | Inv. | 2.4 | 50 | 3.0 | 98.6 | 28.0 | 1.25 | 0.91 |
| 6 | Inv. | 2.4 | 50 | 4.0 | 101.0 | 29.1 | 1.26 | 0.89 |
| 7 | Inv. | 2.4 | 50 | 5.0 | 101.6 | 30.3 | 1.27 | 0.89 |
| 8 | Comp. | 0 | 50 | 0.08 | 93.2 | NH$^h$ | 1.36 | 0.90 |
| 9 | Comp. | 0 | 50 | 0.25 | 90.4 | ND | 1.36 | 0.87 |
| 10 | Comp. | 0 | 50 | 0.50 | 91.6 | ND | 1.36 | 0.87 |
| 11 | Comp. | 0 | 50 | 0.75 | 89.2 | ND | 1.41 | 0.84 |
| 12 | Comp. | 0 | 50 | 1.0 | 88.3 | ND | 1.39 | 0.85 |
| 13 | Comp. | 0 | 50 | 1.5 | 88.6 | ND | 1.40 | 0.84 |
| 14 | Comp. | 0 | 50 | 2.0 | 87.9 | ND | 1.44 | 0.82 |
| 15 | Comp. | 0 | 50 | 3.0 | 87.0 | ND | 1.37 | 0.82 |
| 16 | Comp. | 0 | 50 | 4.0 | 87.8 | ND | 1.40 | 0.78 |
| 17 | Inv. | 2.4 | 70 | 0.25 | 78.1 | 8.5 | 1.16 | 0.70 |
| 18 | Inv. | 2.4 | 70 | 0.5 | 87.0 | 17.8 | 1.22 | 0.80 |
| 19 | Inv. | 2.4 | 70 | 0.75 | 92.2 | 22.5 | 1.25 | 0.84 |
| 20 | Inv. | 2.4 | 70 | 1.0 | 97.0 | 27.6 | 1.26 | 0.87 |
| 21 | Inv. | 2.4 | 70 | 1.5 | 99.6 | 29.4 | 1.30 | 0.93 |
| 22 | Inv. | 2.4 | 70 | 2.0 | 100.0 | 30.3 | 1.31 | 0.88 |

TABLE II-continued

| Run # | Type | DEAC[a] | εCL Pzn Temp., °C.[b] | εCL Pzn Time, hr[c] | % Conv.[d] | % εCL[e] | HI[f] | IV[g] |
|---|---|---|---|---|---|---|---|---|
| 23 | Inv. | 2.4 | 70 | 3.0 | 99.0 | 29.8 | 1.33 | 0.98 |
| 24 | Inv. | 2.4 | 70 | 4.0 | 99.1 | 29.4 | 1.36 | 0.88 |
| 25[i] | Comp. | 0 | 70 | 0 | 99.6 | ND | 1.14 | 0.70 |
| 26 | Comp. | 0 | 70 | 0.08 | 93.3 | ND | 1.35 | 0.88 |
| 27 | Comp. | 0 | 70 | 0.25 | 88.6 | ND | 1.34 | 0.82 |
| 28 | Comp. | 0 | 70 | 0.5 | 87.9 | ND | 1.32 | 0.81 |
| 29 | Comp. | 0 | 70 | 1.0 | 87.6 | ND | 1.30 | 0.77 |
| 30 | Comp. | 0 | 70 | 2.0 | 86.5 | ND | 1.22 | 0.72 |
| 31 | Comp. | 0 | 70 | 3.0 | 85.5 | ND | 1.19 | 0.74 |
| 32 | Comp. | 0 | 70 | 4.0 | 85.8 | ND | 1.16 | 0.73 |

[a]Diethylaluminum chloride in MHM.
[b]Temperature employed in Step 4 for polymerization of ε-caprolactone (εCL).
[c]Time employed in Step 4 for polymerization of εCL.
[d]Percent conversion is determined by dividing weight of dried polymer (×100) by total weight of butadiene and εCL.
[e]Weight percent εCL in dried polymer. Determined by IR spectroscopy using polyεCL for calibration.
[f]Heterogeneity index (Mw/Mn) determined by gel permeation chromatography.
[g]Inherent viscosity determined as described in U.S. Pat. No. 3,278,508 Col. 20, notes a & b.
[h]"ND" means "not determined".
[i]No εCL was employed in run 25. Therefore % conversion was determined based on 1,3-butadiene only.

The data in Table II demonstrate that in inventive runs 1–7 and 17–24 essentially quantitative conversion was obtained after about 3 and 1.5 hour, respectively, for εCL polymerization. In comparative runs 8–16 and 25–32, quantitative conversion was not achieved even after 5 hours, even though high conversion (~93%) was achieved rapidly (5 minutes. Thus it is seen that inventive runs are more controllable and result in essentially quantitative conversion whereas the comparative runs are so rapid as to be difficultly controllable and leave about 15 percent (based on total butadiene and εCL) or 50 percent (based on total εCL) of the monomers unreacted.

Additional inventive runs (33–38) were conducted to further demonstrate the invention. The runs were conducted as described in Table III. The steps in Table III correspond to those in the above-described recipe.

TABLE III

| Ingredient | Recipe Parts by Weight | MHM[a] | Conditions Time, hr | Temp. °C. |
|---|---|---|---|---|
| Step 1 | | | | |
| Cyclohexane | 780 | | 1.0 | 70 |
| Tetrahydrofuran | 0.05 | | | |
| 1,3-butadiene | Variable | | | |
| n-Butyllithium | | 1.2 | | |
| Step 2 | | | | |
| Ethylene oxide | | 3.6 | 0.25 | 50–70 |
| Step 3 | | | | |
| Tetrahydrofuran | 5 | | 0.25 | 50 |
| Diethylaluminum chloride | | 1.2 | | |
| Step 4 | | | | |
| ε-Caprolactone | Variable | | Variable | 50 |
| Step 5 | | | | |
| Phenylisocyanate | | 3.6 | 0.25 | 25–50 |
| Step 6 | | | | |
| Acetic acid[b] | 0.15 | | | |
| Butylated hydroxytoluene[c] | 1 | | | |

[a]Millimole per hundred part by weight of total monomers.
[b]Used as 0.1 M solution in cyclohexane.
[c]Used as 20 wt/vol percent in toluene.

After Step 6 (addition of acetic acid and BHT to terminate polymerization) polymers were coagulated in isopropanol and dried in vacuo at 50° C.

Polymerization variables and results are given in Table IV.

TABLE IV

| Run # | Butadiene, Parts by Weight | εCL, Parts by Weight | εCL Pzn Time, hr | % Conv. | % εCL | HI | IV |
|---|---|---|---|---|---|---|---|
| 33 | 67.5 | 32.5 | 3.0 | 92.1 | 23.6 | 1.34 | 1.06 |
| 34 | 58.4 | 41.6 | 5.0 | 90.9 | 44.4 | 1.44 | 1.03 |
| 35 | 41.6 | 58.4 | 5.0 | 80.8 | 63.7 | 1.73 | 1.01 |
| 36 | 70 | 30 | 4.0 | 97.5 | 28.4 | 1.31 | 1.13 |
| 37 | 70 | 30 | 5.0 | 99.4 | 29.1 | 1.36 | 1.11 |
| 38 | 70 | 30 | 6.0 | 100.0 | 29.8 | 1.37 | 1.16 |

Inventive runs 33–35 in Table IV demonstrate that copolymers with higher proportions of εCL than previously described can be prepared. Since conversions at the times employed were not quantitative, means such as higher temperature, longer polymerization times and/or more alkyllithium or diethylaluminum chloride can be employed with higher εCL proportions in order to boost conversion to near quantitative as desired.

Inventive runs 36–38, demonstrate that lower initiator levels than used in runs 1–7 result in polymers with higher inherent viscosity (molecular weight) than obtained in runs 1–7.

EXAMPLE II

The following inventive runs illustrate the effectiveness of the present invention in preparing block terpolymers containing a block of randomly polymerized 1,3-butadiene and styrene and a block of polymerized ε-caprolactone.

The following recipe gives the ingredients and reaction conditions employed in the various steps of this example.

| Ingredient or Reaction Condition | Recipe Parts by Weight | Condition Value |
|---|---|---|
| Step 1 | | |
| Cyclohexane | 760 | |
| Tetrahydrofuran (THF) | 1.4 | |
| Styrene | 30 | |
| 1,3-Butadiene | 40 | |
| n-Butyllithium (nBL) | Variable | |
| Temp., °C. | | 50 |
| Time, hr | | 0.75–1.0 |
| Step 2 | | |
| Ethylene oxide (EO) | Variable | |
| Temp., °C. | | 50 |

| Recipe | | |
|---|---|---|
| Ingredient or Reaction Condition | Parts by Weight | Condition Value |
| Time, min. | | 5-10 |
| Step 3 | | |
| THF | 3.65 | |
| Diethylaluminum chloride (DEAC) | Variable | |
| Temp., °C. | | 50 |
| Step 4 | | |
| ε-Caprolactone (εCL) | 30 | |
| Temp., °C. | | 50 |
| Time, hr. | | 18.5 |
| Step 5 | | |
| HCl | 0.18 | |
| BHT | 1.0 | |

The polymerizations were conducted as generally described in Example I.

Table V gives the polymerization variables and the results of the runs.

TABLE V

| RUN # | nBL, mhm | EO, mhm | DEAC, mhm | % Conv | % εCL | HI | IV |
|---|---|---|---|---|---|---|---|
| 39 | 0.6 | 1.8 | 0.77 | 99.4 | 33 | 1.9 | 1.7 |
| 40 | 0.8 | 2.4 | 0.96 | 99.6 | 33 | 1.69 | ND |
| 41 | 1.0 | 3.0 | 1.16 | 99.8 | 33 | 1.64 | 1.25 |
| 42 | 1.2 | 3.6 | 1.35 | 99.3 | 34 | 1.35 | 0.96 |
| 43 | 1.4 | 4.2 | 1.54 | 99.4 | 35 | 1.38 | 0.85 |

The data in Table V demonstrate that the polymerizations occurred to essentially quantitative conversion. The polymerization of 1,3-butadiene and styrene as conducted in step 1 in the presence of 1.4 mhm of tetrahydrofuran is known in the art to produce random copolymer. Therefore the resultant polymers are believed to be block terpolymers containing a block of randomly polymerized butadiene and styrene and a block of polymerized ε-caprolactone.

EXAMPLE III

The following inventive runs illustrate the effectiveness of the present invention in preparing block terpolymers containing a block of polymerized styrene, a block of polymerized 1,3-butadiene and a block of polymerized ε-caprolactone.

The following recipe gives the ingredients and reaction conditions employed in the various steps of this example.

| Recipe | | |
|---|---|---|
| Ingredient or Reaction Condition | Parts by Weight or (MHM) | Condition Value |
| Step 1 | | |
| Cyclohexane | 780 | |
| Tetrahydrofuran | 0.05 | |
| Styrene | 30 | |
| n-Butyllithium | (1.7 mhm) | |
| Temp., °C. | | 70 |
| Time, hr. | | 0.75 |
| Step 2 | | |
| 1,3-Butadiene | 40 | |
| Temp., °C. | | 70 |
| Time, hr. | | 1.0 |
| Step 3 | | |
| Ethylene oxide | (5.1 mhm) | |
| Temp., °C. | | 50-70 |
| Time, hr. | | 0.25 |
| Step 4 | | |
| Tetrahydrofuran | 5.0 | |
| Diethylaluminum chloride | (1.7 mhm) | |
| Temp., °C. | | 50 |
| Time, hr. | | 0.25 |
| Step 5 | | |
| ε-Caprolactone | 30 | |
| Temp., °C. | | 50 |
| Time, hr. | | 5-6 |
| Step 6 | | |
| HCl | 0.18 | |
| BHT | 1.0 | |

The polymerizations were conducted as generally described in Example I.

Table VI gives the results of the runs.

TABLE VI

| Run # | % Conv | % εCL | HI | IV |
|---|---|---|---|---|
| 44 | 100 | ND | 1.49 | 0.74 |
| 45 | 100 | 32 | 1.40 | 0.74 |

Analysis of the resultant polymers by gel permeation chromatography showed a single peak which suggests the presence of the expected terpolymer rather than a mixture containing one or more homopolymers.

The sequential polymerization of styrene and 1,3-butadiene as conducted in step 1 is known in the art to produce copolymer containing a block of polymerized styrene and a block of polymerized 1,3-butadiene. Therefore the terpolymers of this example are believed to contain sequential polymerized blocks of styrene, 1,3-butadiene and ε-caprolactone.

What is claimed is:

1. A process comprising
   (a) providing a first product by reacting an organoalkali metal compound with at least one monomer with which it is reactable to form a base polymer, said base polymer being formed from at least one of the monomers selected from the group consisting of conjugated dienes having 4 to 12 carbon atoms per molecule and monovinyl aromatic compounds having 8 to 13 carbon atoms per molecule;
   (b) providing a second product by reacting the first product with an oxirane compound with which it is reactable; said oxirane compound containing 1 to 10 oxirane or epoxy groups per molecule and being provided in an amount of at least 0.1 oxirane group per alkali metal atom in the first product;
   (c) providing a third product by reacting the second product with a metal compound with which it is reactable, said metal compound being provided in an amount of at least 0.1 atoms metal in the metal compound for each atom alkali metal in the second product, said metal compound represented by the formula $$X_n-M-R_{v-n}$$

where M represents a metal selected from the group consisting of Al, Sn, Zn, Cd, Ge, Si and Ti; R represents a monovalent essentially hydrocarbyl radical containing from 1 to 20 carbon atoms, X represents a monovalent basic moiety capable of abstracting the alkali metal from the second product; v is the valence of M and n is at least one and represents the number of X groups connected to M; and (d) providing a fourth product by reacting the third product with at least one lactone with which it is reactable, said lactone having from 3 to 20 carbon atoms per molecule.

2. A process as in claim 1 wherein the metal of the metal compound comprises aluminum and R represents a hydrocarbyl group containing from 1 to 12 carbon atoms and X represents halogen and said metal compound is provided in an amount of at least 0.1 atoms metal in the metal compound for each atom alkali metal in the second product.

3. A process as in claim 2 wherein the lactone comprises ε-caprolactone.

4. A process as in claim 3 wherein the organoalkali metal compound comprises a lithium alkyl and the base polymer is formed from at least one of the monomers selected from the group consisting of butadiene and styrene.

5. A process as in claim 4 wherein the oxirane compound with which the first product is reacted is selected from the group consisting of epichlorohydrin, ethylene oxide, 1,2-epoxypropane, 1,2-epoxybutane and 2,3-epoxybutane.

6. A process as in claim 4 wherein the oxirane compound with which the first product is reacted is selected from the group consisting of 1,3-butadiene diepoxide and 1,2,7,8-diepoxyoctane.

7. A process as in claim 4 further comprising reacting the second product with the metal compound in the presence of a polar compound selected from the group consisting of an ether, an amine, and a sulfide.

8. A process as in claim 4 wherein the metal compound comprises a dialkyl aluminum halide containing from 2 to 12 carbon atoms.

9. A process as in claim 4 wherein the oxirane compound is selected from the group consisting of ethylene oxide and propylene oxide and the metal compound comprises a dialkyl aluminum chloride selected from the group consisting of dimethylaluminum chloride, diethylaluminum chloride, di-n-propylaluminum chloride, and di-n-butylaluminum chloride and the dialkylaluminum chloride is brought together with the second product in the presence of tetrahydrofuran.

10. In a process for the preparation of a copolymer in which lactone monomer is incorporated by reaction with an oxirane-treated alkali metal-terminated base polymer, the improvement comprising reacting the oxirane-treated alkali metal-terminated base polymer with a metal compound supplied in an amount sufficient to provide from about 0.1 to about 5 atoms metal of the metal compound for each atom alkali metal in the oxirane treated alkali metal-terminated base polymer, said metal compound being represented by the formula

where M represents a metal selected from the group consisting of Al, Zn, Sn, Cd, Ge, Si and Ti, R represents a monovalent essentially hydrocarbyl radical containing from 1 to 20 carbon atoms, X represents a monovalent moiety capable of abstracting the alkali metal from the oxirane-treated alkali metal-terminated base polymer; v is the valence of M, n is at least one and represents the number of X groups connected to M, prior to reacting the lactone monomer with the base polymer.

11. A process as in claim 10 wherein the lactone comprises ε-caprolactone.

12. A process as in claim 11 wherein the alkali metal is lithium and the base polymer is formed from at least one of the monomers selected from the group consisting of butadiene and styrene.

13. A process as in claim 12 wherein the metal compound comprises a dialkylaluminum halide containing from 2 to 12 carbon atoms and said metal compound is supplied in an amount of from about 0.5 to about 2 atoms metal of the metal compound for each atom alkali metal in the oxirane treated alkali metal-terminated base polymer.

14. A process as in claim 13 wherein the oxirane compound with which the base polymer is treated is selected from the group consisting of epichlorohydrin, ethylene oxide, 1,2-epoxypropane, 1,2-epoxybutane and 2,3-epoxybutane.

15. A process as in claim 13 wherein the oxirane compound with which the base polymer is treated is selected from the group consisting of 1,3-butadiene diepoxide and 1,2,7,8-diepoxyoctane.

* * * * *